Feb. 26, 1946.  J. L. EWING  2,395,470
RESET VALVE
Filed Nov. 24, 1943  2 Sheets-Sheet 1

INVENTOR
John Lathrop Ewing
BY John Flam
ATTORNEY

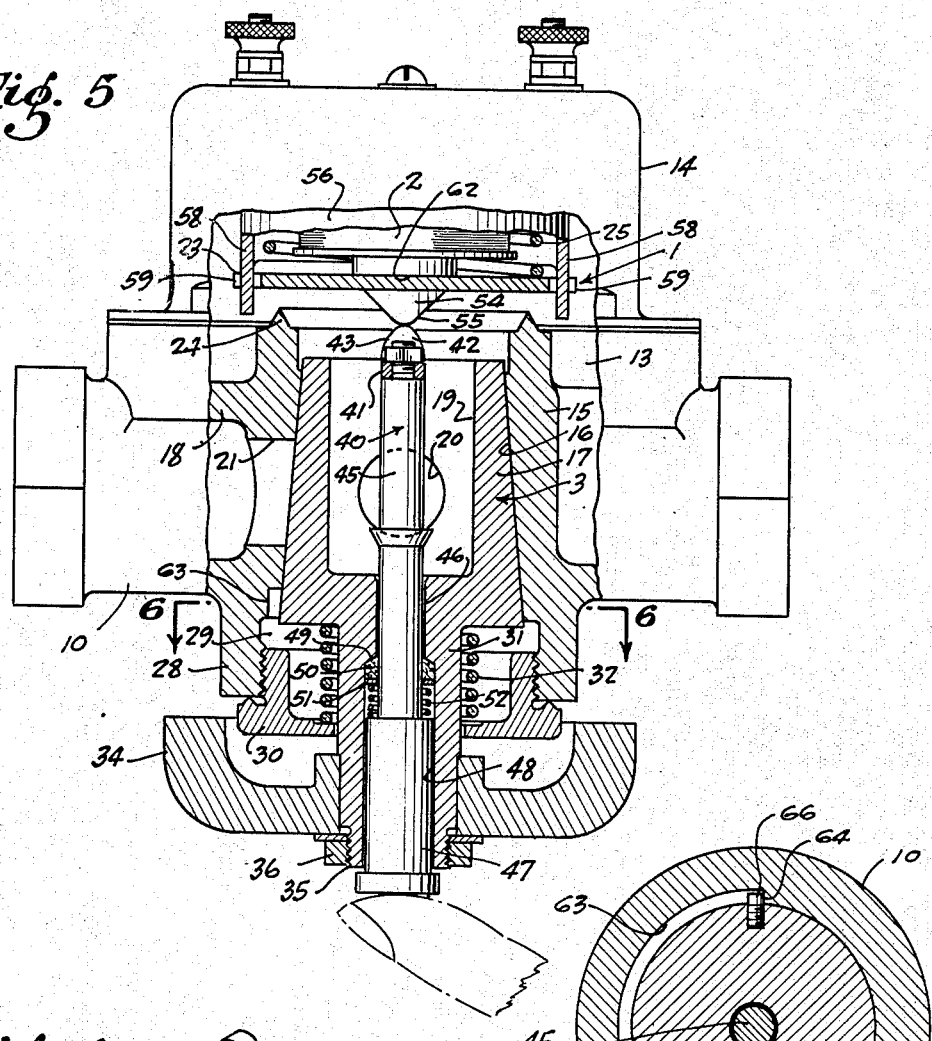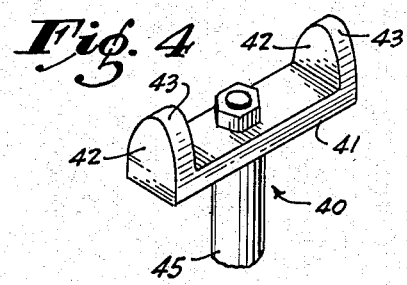

Patented Feb. 26, 1946

2,395,470

UNITED STATES PATENT OFFICE 2,395,470

RESET VALVE

John Lathrop Ewing, San Marino, Calif., assignor to General Controls Co., Glendale, Calif., a corporation of California Application November 24, 1943, Serial No. 511,537

6 Claims. (Cl. 137—144)

This invention relates to a dual valve structure; more particularly the invention relates to an electromagnetic reset valve for fluid fuels.

Such valves are used in fuel supply systems to control the flow of fuel to the burner, and to prevent such flow of fuel unless a pilot flame is burning. A valve structure of this character usually comprises a pair of valves, both of which must be open to permit passage of fuel through the valve structure. One of these valves forming a safety valve is arranged to be maintained open by an electromagnet energized by a thermocouple heated by the pilot flame. The other, or main, valve is manually operable to regulate the passage of fuel to the main burner. Thus, the latter valve may be opened or closed as desired, the pilot flame serving to ignite the fuel passing through the burner whenever this valve is open.

If the pilot flame is extinguished, the safety valve closes, thus preventing passage of fuel through the main valve. To reestablish the fuel supply, the safety valve must be manually returned to open position or reset, and held in such position until the pilot flame is lighted, after which this valve may be released, the electromagnet serving to retain it in open position. If, however, the flame fails to light for any reason, release of the safety valve permits the valve to close again, and the resetting operation must be repeated. Manual resetting of this character is required, because the electromagnet when energized is incapable of attracting the safety valve closure to open position. However, if the safety valve closure is manually moved to open position, the electromagnet has enough force to maintain the valve in open position.

It is an object of this invention to provide such a valve structure of compact and simplified construction and having an improved mode of operation.

It is another object of this invention to provide a reset valve wherein the resetting operation may be performed by the closing of the main valve, or optionally at any time thereafter.

It is still another object of this invention to provide a reset valve including a main valve and a safety valve, and so arranged that operation of the main valve may optionally act directly to actuate the safety valve.

It is still another object of this invention to provide a reset valve having an actuator for opening the safety valve and so arranged that operation of said actuator is ineffective to open the safety valve unless the main valve is closed.

It is still another object of this invention to provide a reset valve having an actuator for the safety valve, so arranged that closing of the main valve causes the actuator to open the safety valve.

It is a still further object of this invention to provide a reset valve having an actuator for the safety valve which is movable in one direction in response to movement of the main valve and optionally in another direction, movement of the actuator in either of these directions serving to condition the actuator to operate the safety valve, and movement of the actuator in the other direction operating the valve. Thus, the safety valve may be operated in response to the closing movement of the main valve, or it may be operated by another movement any time after the main valve is closed.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

In the drawings:

Fig. 4 is a pictorial view of the operating cam;

Fig. 5 is a view similar to Fig. 1, but showing the valve in a different operating position; and Fig. 6 is a section as seen on plane 6—6 of Fig. 5.

Figures 1, 2, 3:
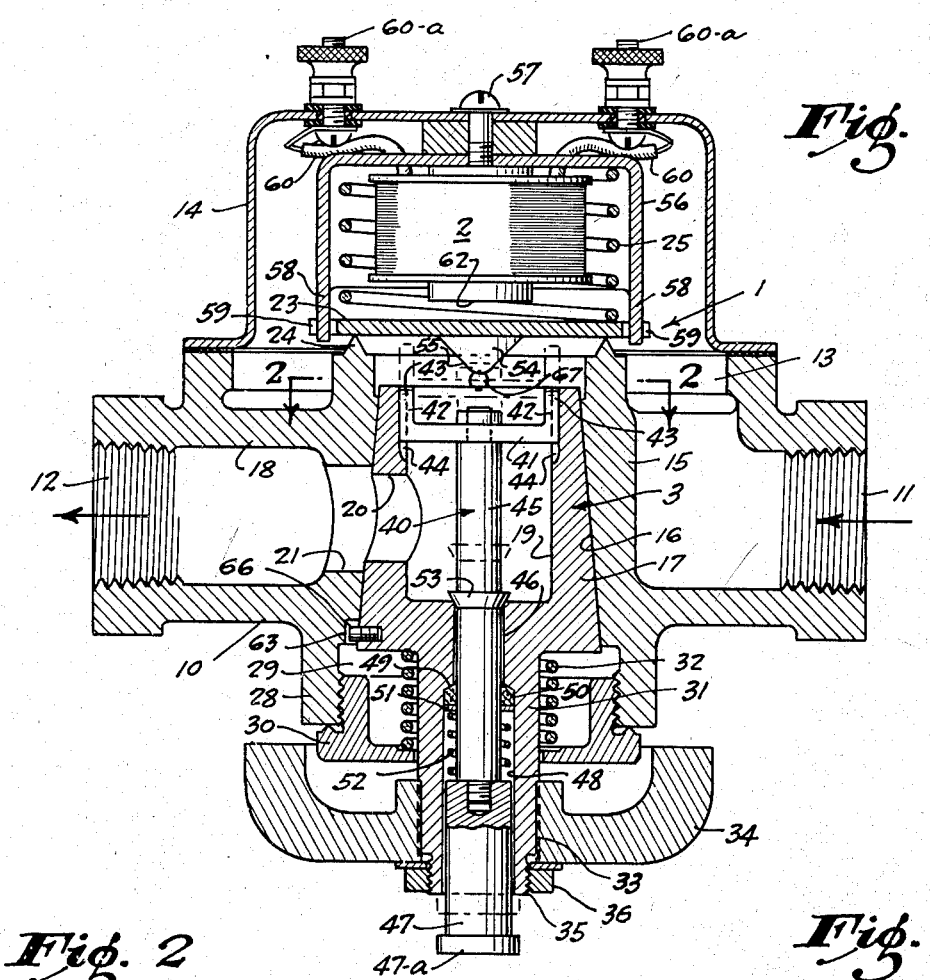
Figure 1 is a longitudinal section through a valve incorporating the invention.
Fig. 2 is a fragmentary section as seen on plane 2—2 of Fig. 1.
Fig. 3 is a pictorial view of the safety valve closure member.

This valve is of the type for controlling the fluid fuel supply to a burner which is intermittently operated, a constantly burning pilot flame being provided for igniting the main burner after periods of inactivity.

The valve structure comprises a main valve 3 which is manually operable for optionally controlling the supply of fuel to a main burner (not shown). Obviously it is important to provide means whereby, upon extinguishment of the main burner and of the pilot burner, the supply of fuel to these burners is interrupted. Further, means must be provided for preventing re-establishment of the supply to the main burner until the pilot burner has been relighted. For this purpose, a safety valve 1 is provided controlling the passage of fuel through the valve and is adapted to be retained in open position by an electromagnet 2, energized in response to electricity generated by the heat of the pilot burner flame in a well known manner, as by a thermocouple (not shown). Upon the extinguishment of the pilot burner for any reason, electromagnet 2 is de-energized, permitting valve 1 to close, and stopping all fuel supply to the burners. To avoid a dangerous condition when the valve 1 is reopened, the means for opening valve 1 is so arranged that main valve 3 must be closed before the valve 1 can be opened. Further, before both valves 1 and 3 can be maintained in open position, the pilot burner must be lighted to energize magnet 2 to retain valve 1 in open position.

The valve structure comprises an elongated body 10 having axially aligned threaded openings 11 and 12 at its opposite ends for connection to suitable conduits and forming, respectively, the inlet and outlet. Between the inlet and outlet openings 11 and 12 is a transverse opening 13, closed by a detachable cover 14. There is also a boss 15 extending transversely of body 10 and forming a seat 16 for a tapered rotary plug 17, and a web wall 18. The boss 15, plug 17, and wall 18 serve to interrupt communication between the inlet 11 and outlet 12. To establish communication between the inlet and the outlet, plug 17 has an axial port 19 adapted to connect with inlet 11 and intersected by a radial port 20 adapted to connect with outlet 12 through port 21 in the boss 13. Rotation of plug 17 in seat 14 serves to place ports 20 and 21 into or out of registry as desired.

Safety valve 1 includes a valve member 23 in the form of a disc of magnetic material adapted to cooperate with a valve seat 24 formed on the upper end of boss 15. A light compression spring 25 urges disc 23 toward seat 24. When member 23 is on seat 24, communication between inlet 11 and port 19 is interrupted; hence, no fluid can pass from inlet 11 to outlet 12 regardless of the registry of ports 20 and 21.

The body 10 has a downwardly extending circular wall 28 coaxial with seat 16, defining a space 29 which forms a continuation of the space within seat 16. Wall 28 is interiorly threaded for the reception of a cap 30, through which passes stem 31 of plug 17. A compression spring 32 surrounds stem 31 and is confined between the cap 30 and the bottom of plug 17, for the purpose of maintaining plug 17 on its seat 16. The outer portion of stem 31 is splined as at 33 for the reception of an operating handle 34, and threaded at 35 for a nut 36 which secures handle 34 on the stem 31.

As a means of unseating the safety valve closure 23, an actuator 40 is mounted in port 19 of the plug 17. Actuator 40 comprises a cross piece or member 41 extending diametrically of port 19, with upturned projections or cams 42 at its opposite ends providing projectible cam surfaces 43 (see Fig. 4). These projections 42 engage slots or key ways 44 formed in the plug 17, whereby the actuator 40 is constrained to rotate with the plug. Cross piece 41 is suitably secured to the upper end of a post or stem 45 coaxial with plug 17 and axially movable therein. Post 45 extends through a bore 46 in stem 31 and has an operating extension 47 of increased diameter which extends out of the lower end of stem 31.

Bore 46 has an enlarged portion 48 for accommodating the extension 47, bore 46 being joined to bore 48 by an inclined annular shoulder 49. Suitable packing 50 is confined between shoulder 49 and a light metal or fiber washer 51. A spring 52 is interposed between the upper end of extension 47 and washer 51 and serves to maintain packing 50 on shoulder 49 as well as to expand it into packing relation with stem 46 and the interior of bore 48. Spring 52 also serves to resiliently maintain actuator 40 in its normal or retracted position shown in Fig. 1. To limit movement of actuator 40 in response to spring 52, a conical stop member 53 is provided on post 45 and is arranged to seat at the upper end of bore 46. This stop 53 thus serves to prevent leakage of fuel outwardly past stem 45 when the actuator is in normal position. When stem 45 is raised for the purpose of opening safety valve 1, as will be presently described, packing 50 serves to prevent such leakage past the stem 45. Packing 50 also supplements the sealing action of the stop 53, checking any leakage that may escape past this stop.

Safety valve closure 23 is provided with cams 54, providing cam surfaces 55 (see Fig. 3) for cooperating respectively with cams 42 and cam surfaces 43. The arrangement is such that with actuator 40 in its lower or normal position, cams 42 will clear cams 54 for any and all positions of plug 17 about its axis, as will appear from an inspection of Fig. 1 which illustrates the valve structure with the safety valve 1 seated, as it would be when the pilot flame is not burning. Furthermore, with the main valve or plug 17 open as shown, axial movement of actuator 40 to its uppermost position as indicated by the broken lines, will not affect the closure 23 since with head 47—a of the operating extension 47 in engagement with the end of stem 31, the high points of cams 42 can not engage closure 23. In other words, cams 43 are angularly displaced in either direction from cams 54.

However, if plug 17 is rotated approximately 90° in either direction from the position of Fig. 1, for example to that of Fig. 5, cams 42 and 54 will be operatively alined one above the other or in a vertical direction, and upward movement of actuator 40 will cause engagement of the high points of cam surfaces 43 and 55 and lift closure member 23 from its seat. Or if member 40 is pressed upwardly to about the broken line position of Fig. 1, the cams 42 and 54 will operatively be alined in a polar direction or circumferentially about the axis of plug 17, whereupon rotation of plug 17 will cause engagement of the sides of cam surfaces 43 and 55, the inclination of these surfaces being such that continued rotation of the plug will raise closure member 23 from its seat 24. For such operation it is necessary that member 23 be restrained against rotation. Accordingly, magnet 2 is mounted in a cup 56 secured in casing 14 as by a screw 57 and provided with teeth 58 on its lower edge, which engage slots 59 formed in the periphery of closure 23. The coil on electromagnet 2 is connected by leads 60 within cap 14 to binding posts 60—a, which in turn are to be joined to the thermocouple or the like by appropriate conductors (not shown).

It will be understood that the actuator 40, cam surfaces 43, etc. are capable of movement in diverse directions, that is, movement vertically or axially of plug 17 and rotary or angular movement about the axis of plug 17 together with the plug, and that either movement may be accomplished first, or the movements may occur together. Further, that the movement which occurs first acts to operatively aline the cams 42 and 54, while the succeeding movement causes the cams 42 and 54 to transmit the vertical displacement of actuator 40 to valve closure 23. If both movements occur generally together, the motion of cam 54 and the closure 23 will obviously be the resultant of such combined movements.

The cams 42 and 54 and cooperating parts are so proportioned that with plug 17 substantially 90° from the position of Fig. 1, actuator 40 will have ample axial movement to bring closure 23 into contact with surface 62 of magnet 2. Further, the angular extent of ports 20 and 21 is such as compared with the proportions of cams 42 and 54 that the ports are entirely out of registry before cam surfaces 43 and 55 can be brought into engagement. Thus the safety valve 1 can not be opened until the main valve 3 is closed.

For supplying fuel to the pilot burner, a port 67 is provided in boss 15, just below valve seat 24 and above plug 17. This port communicates with the pilot burner through a suitable conduit and passage in body 10 (not shown). By so locating port 67, fuel supply to the pilot is stopped upon closure of the safety valve 1, as a result of extinguishing of the pilot; at the same time the fuel supplied to the pilot is independent of valve 3, which may be opened or closed without affecting the pilot flame.

The operation of the valve structure is as follows.

When the pilot flame is not burning, either as a result of accidental extinguishment or upon initiation of operation, closure 23 of safety valve 1 is on its seat 24, preventing any passage of fuel from inlet 11 to outlet 12, or to pilot port 67. When it is desired to open safety valve 1 to initiate operation of the system or to reset the valve, the main plug 17 may be turned about 90° from the position of Fig. 1 to operatively aline cams 42 and 54 in a vertical direction. To aid in determining when the cams are properly alined, a groove 63 (see Fig. 6) may be provided in body 10 at the lower end of seat 16, extending slightly more than halfway about the periphery of the seat. The opposite ends 64 and 65 of groove 63 form stops adapted to cooperate with a pin 66 carried by plug 17 for limiting movement of the plug to 90° in either direction from the position of Fig. 1. With plug 17 90° from the position of Fig. 1, for example in the position of Fig. 5, upward pressure is exerted on operating extension 47 to move actuator 40 upwardly, which upward movement is transmitted to closure member 23, moving it off seat 24 and into engagement with face 62 of magnet 2. This permits fuel to pass from inlet 11 to port 67 and thence to the pilot burner, but no fuel can pass to outlet 12 and the main burner due to the closed position of plug 17.

Or the safety valve closure 23 can be brought into open position by first pressing the actuator 40 upwardly to the limit of its movement and then rotating plug 17 90° in either direction to closed position. In this case the rotation of plug 17 acts to unseat closure 23, while in the first case the vertical movement of actuator 40 unseats closure 23. In either case, plug 17 must be closed before closure 23 can be unseated; and in the first case, closure 23 can be unseated at any time after closure of plug 17. Thus the safety valve 1 may be opened either independently of the closing operation of the main valve or as a function of such operation.

To retain closure 23 in open position after release by the actuator 40, either by removal of the upward pressure on the actuator 40 or by rotation of plug 17 to open position, it is necessary that magnet 2 be energized. For this purpose, the pilot burner must be lighted and kept burning for a brief period until the thermocouple heated thereby generates sufficient current to energize magnet 2. Upon extinguishment of the pilot flame, magnet 2 is immediately deenergized, allowing closure 23 to seat in response to gravity and the force of spring 25.

What is claimed is:

1. In a valve structure, a body having a fluid passage therethrough, a first valve and a second valve in said body, each being movable between open and closed positions for controlling flow of fluid through said passage, actuating means for said second valve carried by said first valve for movement with said first valve as it moves between open and closed positions and being freely movable in a direction transverse to the direction of such movement, to and from a position in which it is adapted to actuate said second valve, operating means for moving said first valve between open and closed positions and for moving said actuating means to and from actuating position, said second valve having a member for moving it from closed to open position, said member being positioned to be engaged and moved by said actuating means, said actuating means being so shaped as to cause said member to open said second valve only when said actuating means has been moved fully to its actuating, first valve closed position, by operation of said operating means either, first, to close said first valve and then to move said actuating means to actuating position, or, first, to move said actuating means to actuating position and then to close said first valve.

2. In a valve structure, a body having a fluid passage therethrough, a first valve and a second valve in said body, each being movable between open and closed positions for controlling flow of fluid through said passage, actuating means for second valve carried by said first valve for movement with said first valve as it moves between open and closed positions and being freely movable in a direction transverse to the direction of such movement, to and from a position in which it is adapted to actuate said second valve, operating means for moving said first valve between open and closed positions, means for moving said actuating means to and from actuating position, said second valve having a member for moving it from closed to open position, said member being positioned to be engaged and moved by said actuating means, said actuating means being so shaped as to cause said member to open said second valve only when said actuating means has been moved fully to its actuating, first valve closed position, either by operation of said operating means, first, to close said first valve and then by moving said actuating means to actuating position, or by first moving said actuating means to actuating position and then operating said operating means to close the first valve.

3. In a valve structure, a body having a fluid passage therethrough, a first valve and a second valve in said body, each being movable between open and closed positions for controlling flow of fluid through said passage, actuating means movable with said first valve as it moves between open and closed positions and in the direction of such movement, and being freely movable in another direction between retracted and extended positions, operating means for moving said first valve between open and closed positions and for moving said actuating means between retracted and extended positions, said second valve having a member for moving it from closed to open position, said member being positioned to be engaged and moved by said actuating means, said actuating means being so shaped as to move said member to open said second valve only when said actuating means has been moved fully to its extended, first valve closed position, by movement of said operating means either, first, to close said first valve and then to extend said actuating means, or first to extend said actuating means and then to close said first valve.

4. In a valve structure, a body having a fluid passage therethrough, a first valve having a rotary closure and a second valve having a closure movable transversely of the direction of rotation of said rotary closure, each of said closures being movable between open and closed positions for controlling flow of fluid through said passage, actuating means movable with said rotary closure as it moves between open and closed positions, and being freely movable in a direction transverse to said rotary movement, between retracted and extended positions, operating means for moving said rotary closure between open and closed positions and for moving said actuating means between retracted and extended positions, said second valve closure having a member for moving it from closed to open position, said member being positioned to be engaged and moved by said actuating means, said actuating means being so shaped as to move said member to open said second valve only throughout a definite range of angular movement of said rotary closure.

5. In a valve structure, a rotatable plug, a valve body providing a seat for said plug, said plug being operable to open and closed positions to control the passage of fluid by way of the plug, and having for that purpose a passageway opening in one end of the plug, means adjacent the end of said passageway forming a safety valve seat, a closure adapted to cooperate with said seat for controlling passage of fluid through said passageway and movable toward and away from said seat, actuating means movable with said plug as it moves between open and closed positions and being freely movable in the direction of movement of said closure between retracted and extended positions, operating means for moving said plug between open and closed positions and for moving said actuating means between retracted and extended positions, said closure having a member for moving it from its seat, said member being positioned to be engaged and moved by said actuating means, said actuating means being so arranged as to move said member to unseat said closure only throughout a definite range of angular movement of said plug.

6. In a valve structure, a body having a fluid passage therethrough, a first valve having a rotary closure, and a second valve having a closure reciprocable in a direction axially of said rotary closure and axially spaced therefrom, each of said closures being movable between open and closed positions for controlling flow of fluid through said passage, actuating means supported for reciprocating movement axially with respect to the rotary closure and freely movable between retracted and extended positions, means restraining said actuator against relative angular motion with respect to said rotary closure, operating means for moving said rotary closure between open and closed positions and for moving said actuating means between retracted and extended positions, said reciprocable closure having a member for moving it from closed to open position, said member being adapted to be engaged and moved by said actuating means, said actuating means being so shaped as to move said member to move said reciprocable closure to open position only throughout a definite range of angular movement of said rotary closure.

JOHN LATHROP EWING.